Figure 1:
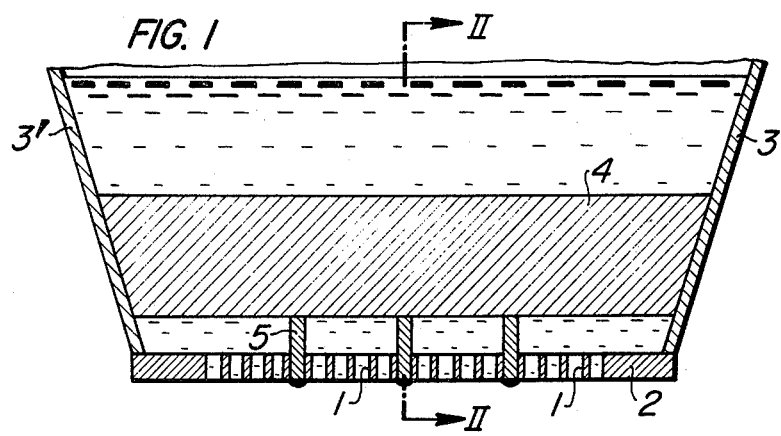

United States Patent [19]

Shono et al.

[11] 4,178,162
[45] Dec. 11, 1979

[54] BUSHING FOR APPARATUS FOR SPINNING GLASS FIBERS

[75] Inventors: Hiroaki Shono; Shinzo Ishikawa; Isao Wakasa; Miyako Adachi, all of Fukushima, Japan

[73] Assignee: Nitto Boseki Co., Ltd., Fukushima, Japan

[21] Appl. No.: 963,145

[22] Filed: Nov. 22, 1978

Related U.S. Application Data

[63] Continuation of Ser. No. 810,284, Jun. 27, 1977, abandoned.

[30] Foreign Application Priority Data

Jul. 7, 1976 [JP] Japan .................................. 51-80724

[51] Int. Cl.² ........................................... C03B 37/02
[52] U.S. Cl. ............................................ 65/1; 65/2; 65/11 W

[58] Field of Search .................... 65/1, 2, 11 W, 12

[56] References Cited

U.S. PATENT DOCUMENTS

| | | | |
|---|---|---|---|
| 3,902,430 | 11/1975 | Carey | 65/1 |
| 3,988,135 | 10/1976 | Coggin | 65/1 |

*Primary Examiner*—Robert L. Lindsay, Jr.
*Attorney, Agent, or Firm*—Norbert P. Holler

[57] ABSTRACT

Disclosed is a bushing for spinning glass fibers having at its bottom an orifice plate provided with a great number of extremely densely disposed plain holes constituting orifices. In order to stiffen the orifice plate, beam members are provided in the bushing to extend substantially in parallel with and spaced from the orifice plate. Each beam member is fixed at its both ends to confronting walls of the bushing, and is connected to the orifice plate by means of rod members having a small diameter.

8 Claims, 3 Drawing Figures

BUSHING FOR APPARATUS FOR SPINNING GLASS FIBERS

This is a continuation of application Ser. No. 810,284 filed June 27, 1977 now abandoned.

The present invention relates to a bushing for glass fiber spinning apparatus and, more particularly, to an improvement in bushing having a bottom orifice plate provided with a number of extremely densely arranged orifices consisting of plain holes.

According to a current technique of manufacturing glass fibers, a bushing is used to contain molten glass which is the material of the glass fiber. The bushing is provided at its bottom with an orifice plate having 400 to 2000 orifices. The molten glass in the bushing is forced out through the orifices, by the static head and viscosity, to form a number of glass cones which are then mechanically drawn to be turned into fibers.

This method, however, has been found inconvenient in that the orifice plate is apt to be bent and deflected to cause the lower surface to become convex downwardly, as the time elapses, due to a combined effect of weight of the molten glass in the bushing, spinning tensile force, high spinning temperature which well reaches 1100° to 1300° C. and so on. This deflection of orifice plate causes a difference in the rates of heat radiation from the glass cones suspended from the orifice plate, especially between the orifices located near the periphery of the orifice plate and the orifices located near the center of the orifice plate, resulting in an unstable spinning.

In addition, the deflection of the orifice plate badly affect the stability of the glass cones to incur the breakdown of the latter, due to an increased component of force to pull the glass cones laterally along the orifice plate. Moreover, the deflection of the orifice plate tends to cause so-called "flooding" in which the cones creep through capillary action along the underside of the orifice plate to join adjacent cones. Once the flooding takes place, it is quite difficult to resume the separate flows of glass cones.

In order to avoid this inconvenience, various methods have been proposed and actually used, such as increasing the distance between adjacent orifices, thickening of the orifice plate itself and provision of reinforcing ribs on the orifice plate. However, these proposed methods have been found unsatisfactory because the size of the bushing becomes unacceptably large, which causes non-uniform temperatures to occur within the molten glass held by the bushing, which in turn renders the nature of the glass flow irregular and causes the breakdown of the fibers, resulting in a deteriorated yield, or, even if the fibers are not broken, the diameter of the fibers inconveniently fluctuate to reduce the strength of the product fibers. In addition, since the orifice plate is made of platinum, the large size of the bushing inevitably leads to a high cost of installation.

Recently, demands for increase of yield through thickening of orifices and reduction of cost of installation through minimizing the size of the bushing are notable. In present day fiber spinning apparatus, a bushing is used having an orifice plate provided with 2000 to 6000 plain hole orifices which are so densely arranged, e.g. at intervals of 3 mm or smaller, that the glass cones from the plain hole orifices join one another to cause the aforementioned flooding condition, if suitable means are not provided for preserving the separate flows of glass cones.

Thus in order to obtain a good spinning from such bushing having densely arranged plain hole orifices, it is strictly required to avoid the flooding at the underside of the orifice plate by the flowing glass, i.e. undesirable joining of the glass cones with one another. To this end, U.S. Pat. No. 3,905,790 discloses the use of air nozzles adapted to jet out cooling air upwardly to cool the underside of the orifice plate and the surfaces of the flowing glass cones, so as to increase the viscosity of the glass cones, thereby to prevent them from joining. However, in the apparatus as disclosed in this U.S. Patent specification, the plain hole orifices are so densely provided that the orifice plate assumes a form resembling a net and exhibits too large a deflection due to its reduced rigidity. Consequently, the upward flow of the cooling air toward the orifice plate provides an uneven cooling effect on the glass cones, resulting in a fluctuation of the diameter of the fibers and, in a severe case, the breakdown of the fibers, which considerably deteriorates the working efficiency and the yield.

It has been proposed, in order to overcome the drawback attributable to the deflection of the bushing, to provide stiffening ribs on the orifice plate by means of, for example, welding. However, in the modern bushing having an orifice plate provided with a great number of plain hole orifices arranged extremely densely, the orifice plate cannot have enough space for fixing the stiffening ribs thereto. Thus, the provision of the stiffening rib is possible only at a cost of enlarged space between adjacent rows of plain hole orifices at portions of the orifice plate where the ribs are to be secured, undesirably enlarging the area of the orifice plate, which is quite incompatible with the current demand for a larger number of orifices as possible in a small area.

Moreover, when such stiffening ribs are provided, the glass cones at the underside of the orifice plate are inevitably divided into a plurality of sections by these ribs. Consequently, the heat radiating conditions are different for the glass cones at the inner and the outer sides of each group, such that the glass cones at the outer side perform larger heat radiation than those located at the inner side of each group, to exhibit correspondingly lowered temperature, causing an uneven temperature distribution over the orifice plate, which also badly affects the production efficiency.

It is therefore an object of the invention to provide an improved bushing for spinning glass fibers having an orifice plate provided with an increased number of plain hole orifices per unit area, and sufficiently reinforced against deflection.

It is another object of the invention to provide an improved bushing for spinning glass fibers in which neither the quality of the product fibers nor the production efficiency is affected by the provision of stiffening or reinforcing ribs.

It is still aother object of the invention to provide an improved bushing for spinning glass fibers which is sufficiently reinforced and, nevertheless, economical.

To these ends, according to the invention, there is provided a bushing for a glass fiber spinning apparatus, having at its bottom an orifice plate provided with a great number of orifices consisting of plain holes arranged so densely that molten glass cones consisting of masses of molten glass having flowed out of said bushing through respective orifices tend to join with adjacent ones, so as to cause a flooding condition at the downside of said orifice plate, said bushing having a beam member of members disposed therein and connected at both ends to the opposing walls of said bushing, said beam member extending in parallel with and spaced from said orifice plate, and at least one rod member connecting said beam member to said orifice plate.

Figure 2:
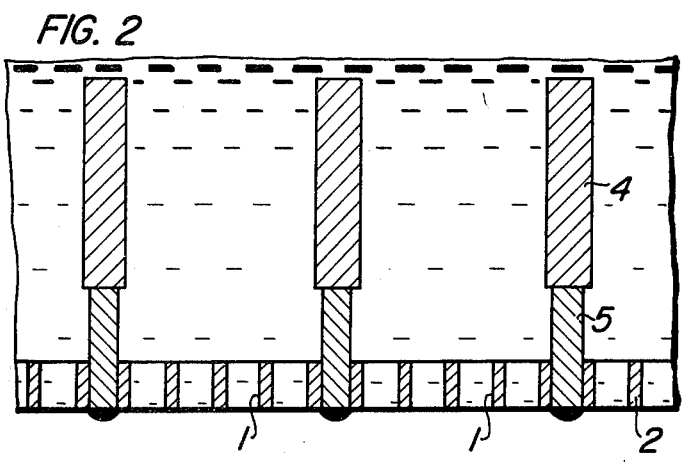
Figure 3:
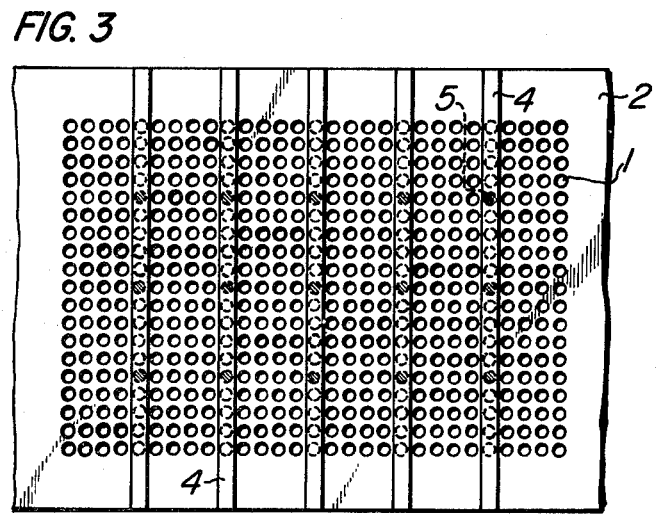

These and other objects, as well as advantageous features of the invention will become clear from the following description of the preferred embodiment taken in conjunction with the attached drawings in which:

FIG. 1 is a sectional side elevational view of a bushing in accordance with the invention, FIG. 2 is a partial enlarged sectional front elevational view taken along the line II—II of FIG. 1, and FIG. 3 is a partial plan view of the bushing as viewed from the upper side thereof, showing the detail of the internal structure of the bushing.

The invention will be described hereinafter with specific reference to the attached drawings.

Referring at first to FIGS. 1 and 2, a bushing in accordance with the invention is provided at its bottom with an orifice plate 2 in which formed are a great number of orifices 1 in the form of extremely densely arranged plain holes. The bushing has opposing walls 3, 3' to which respective ends of beam members 4, are secured by means of, for example, welding. These beam members 4, extend in parallel with and spaced from the orifice plate 2. The beam members 4, are connected to the orifice plate 2 through rod members 5 having a small diameter. The beam members 4 and the rod members 5 in combination constitute stiffening or reinforcing members for the orifice plate.

As will be seen from FIG. 3, the beam members 4 are disposed to extend at right angles to the longitudinal direction of the bushing when the latter has a rectangular profile, and the number of the beam members is optionally selected depending on the size of the bushing, while the number of rod members is suitably selected in accordance with the length of the beam members.

Needless to say, the beam members may be disposed to extend radially from the center of a circle or may be arranged in parallel with one another, when a cylindrical bushing is used, and any other pattern of the arrangement of the beam members can be adopted, e.g. in the form of a lattice or the like, as necessitated.

The distance between the beam member and the orifice plate is preferably within a range of between 1.5 to 10 mm. A too small distance would adversely affect the supply of the molten glass to the orifices, while a too large distance would cause an excessively large elongation or strain of the rod members to deteriorate the stiffening effect on the orifice plate.

The beam member can have any desired shape such as flat plate, rod and the like, and is preferably made of platinum. Thus, in order to minimize the expense, the beam members are made small, insofar as they can ensure sufficient stiffening effect. Also, the rod members connecting the beam members to the orifice plate should be made as small as possible. For the same reason, the number of beam members employed in a bushing, as well as the number of the rod members for each beam member, should be made as small as possible, consistent with a satisfactory stiffening effect.

The pitches at which the beam members and the rod members are disposed, respectively, are typically 10 to 50 mm, and 5 to 20 mm, although they depend on the size of the orifice plate and the number of plain hole orifices formed in the latter.

Thanks to the structural features as stated above, the orifice plate of the bushing in accordance with the invention is rendered free from the force which would cause the downward deflection of the orifice plate, since the force is conveniently born by the reinforcing members consisting of the beam and the rod members. In addition, the reinforcing members occupy only a very limited area on the orifice plate. More specifically, the number of the orifices rendered invalid or useless by the provision of the reinforcing members is very small for the total number of the orifices, so that the temperature differential between the glass cones from respective orifices is conveniently reduced. Thus, according to the invention, the entire area of the orifice plate can be effectively used for densely and uniformly locating the orifices, in good contrast to the conventional arrangement in which the distance between the adjacent orifices is made large at portions where the reinforcing members are located, or the orifices are arranged in a plurality of separate groups.

However, it is to be noted that the present invention is applicable also to a bushing which has an orifice plate provided with orifices arranged in groups separated by the reinforcing members, to effectively prevent the orifice plate from being deflected at portions thereof where the groups of orifices are located.

Another advantage of the invention resides in that the separation of the joining glass cones into respective independent cones can be performed efficiently. As mentioned before, this separation of the joining cones is usually effected by upward flow of air jetted from air nozzles toward the underside of the orifice plate, so as to cool the orifice plate to facilitate the separation of the molten glass in the flooding condition from the orifice plate and thereby promote the separation of the joining glass cones. However, as the separation is performed to some extent, the temperature of the orifice plate rises again, as a result of the increased flow rate of the molten glass through the orifices and the correspondingly increased amount of heat brought out by the molten glass. This temperature rise undesirably causes rejoining of the glass cones. This tendency renders the separation work considerably difficult, especially when the number of the orifices employed is large.

However, according to the invention, the separation of the joining glass cones is commenced at first at portions where the spaces between adjacent orifices are larger, due to the provisions of the rod members, than other portions, to define a plurality of groups of joining glass cones. The separation then goes on in each group. It will be understood that such a procedure of separation is less likely to cause the rejoining of the glass cones, and enhances separation efficiency.

In fact, according to the invention, the time can be reduced to almost a half of that required by the conventional technique, in separating the joining glass cones.

The advantageous features of the invention will be more fully understood from the following description of examples of bushings in accordance with the invention.

EXAMPLE 1

Glass fiber spinning was carried out by means of a bushing having at its bottom an orifice plate having 2000 orifices arranged at a constant pitch of 1.80 mm and reinforced by three reinforcing ribs directly attached thereto. The bushing could be used for 0.8 month, while another bushing having the same orifice plate but seven reinforcing members was found to be usable for 2 months, but exhibited bad spinning performance due to uneven temperature distribution over the orifice plate.

In good contrast to the above, it has been confirmed that a bushing in accordance with the invention incorporating 11 reinforcing members can endure for 12 months, suffering no uneven temperature distribution over the orifices. The reinforcing members incorporated three rod members for each beam member, so that the orifice plate was supported at three points by each of the reinforcing members.

EXAMPLE 2

Glass fiber spinning was conducted employing a bushing having at its bottom an orifice plate reinforced by 5 directly fixed reinforcing members and provided with 4,000 orifices disposed at a constant pitch of 1.80 mm. Due to the deflection of the orifice plate, this bushing could be used only for 0.6 months, and some uneven temperature distribution was observed, while a bushing of the invention incorporating 17 reinforcing members could be used for 10 months, exhibiting almost no uneven temperature distribution. The reinforcing members incorporated had three rod members for each beam member.

As described above the present invention provides at least one reinforcing member consisting of a beam member fixed at both ends to the wall of the bushing and at least one rod member connecting the beam member with the orifice plate. These reinforcing members minimize the deflection of the orifice plate and promote stable spinning of glass fibers through the orifice plate.

What is claimed is:

1. A bushing for a glass fiber spinning apparatus, having at its bottom an orifice plate provided with a great number of orifices consisting of plain holes arranged so densely that molten glass cones associated with the respective orifices tend to join, so as to cause a flooding condition at the downside of said orifice plate, said bushing further comprising at least one beam member disposed in said bushing and connected at both ends to the opposing walls of said bushing, each such beam member extending in parallel with and spaced from said orifice plate, and at least one rod member affixed at one end to one such beam member and affixed at the other end to said orifice plate, each such rod member extending substantially perpendicularly to said orifice plate, each such rod member having a diameter substantially equal to the diameter of one of said plain holes.

2. A bushing as claimed in claim 1, wherein each such rod member is fixedly inserted in one of said holes.

3. A bushing as claimed in claim 1, wherein each such beam member is spaced from said orifice plate by 1.5 to 10 mm.

4. A bushing as claimed in claim 1, wherein a plurality of such beam members are disposed at a constant pitch in parallel relationship with one another.

5. A bushing as claimed in claim 4, wherein said beam members are disposed at a pitch of 10 to 50 mm.

6. A bushing as claimed in claim 5, wherein a plurality of rod members are disposed at a constant pitch of 5 to 20 mm aling each such beam member.

7. A bushing as claimed in claim 1, wherein said beam members are arranged in plural to extend radially, intersecting at the center of said bushing.

8. A bushing as claimed in claim 1, wherein said beam members are arranged in plural, assuming a form of a lattice.

* * * * *